(12) United States Patent
Allen et al.

(10) Patent No.: US 9,091,027 B2
(45) Date of Patent: Jul. 28, 2015

(54) ASPHALT COMPOSITION

(75) Inventors: David Allen, Lincoln, NE (US); Flavio Souza, Fortaleza (BR); Yong-Rak Kim, Yongin-si (KR); Roberto Soares, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 518 days.

(21) Appl. No.: 13/512,183

(22) PCT Filed: Nov. 30, 2009

(86) PCT No.: PCT/US2009/066071
§ 371 (c)(1),
(2), (4) Date: Sep. 24, 2012

(87) PCT Pub. No.: WO2011/065953
PCT Pub. Date: Jun. 3, 2011

(65) Prior Publication Data
US 2013/0013272 A1 Jan. 10, 2013

(51) Int. Cl.
*G06F 7/60* (2006.01)
*G06G 7/48* (2006.01)
*E01C 1/00* (2006.01)
*G06F 17/50* (2006.01)

(52) U.S. Cl.
CPC .............. *E01C 1/002* (2013.01); *G06F 17/5018* (2013.01); *G06F 2217/44* (2013.01); *G06F 2217/76* (2013.01)

(58) Field of Classification Search
None
See application file for complete search history.

(56) References Cited

U.S. PATENT DOCUMENTS 8,530,365 B2 * 9/2013 Peled et al. ............... 501/141

OTHER PUBLICATIONS

"A model for predicting the evolution of multiple cracks on multiple length scales in viscoelastic composites", Allen et al. Springer Science Business Media, LLC 2006.*
"On the characterization of &exible pavement rutting using creep model-based !nite element analysis", Fang et al. Finite Elements in Analysis and Design 41 (2004).*
Authorized Officer B.S. Park. International Search Report in International Application No. PCT/US2009/066071, dated Sep. 2, 2010, 11 pages.
Authorized Officer S. Baharlou. International Preliminary Report on Patentability in International Application No. PCT/US2009/066071, dated Jun. 5, 2012, 8 pages.
Allen et al., "Chapter 11: Multiscale Modeling of the Evolution of Damage in Heterogeneous Viscoelastic Solids," 2008, 495-527.
Beldica et al., "Analytical Simulations of Optimum Anisotropic Linear Viscoelastic Damping Properties," *Proceedings American Society for Composites Thirteenth Annual Technical Conference*, 1998, paper No. 14, 17 pages.
Costanzo et al., "A continuum Thermodynamic Analysis of Cohesive Zone Models," *International Journal of Engineering Science*, 1995, 33(15):2197-2219.

(Continued)

*Primary Examiner* — Omar Fernandez Rivas
*Assistant Examiner* — Nithya J Moll
(74) *Attorney, Agent, or Firm* — Fish & Richardson P.C.

(57) ABSTRACT

A computational method is provided for predicting roadway failure due to degradation of the roadway over time as a function of the input loads, the roadway geometry, the material properties of the constituents in the asphaltic pavement, the shape, distribution, orientation and volume fractions of the constituents, and environmental conditions. The unique and new feature of the method is that it employs several physically based predictive methodologies simultaneously.

17 Claims, 7 Drawing Sheets

(56) References Cited

OTHER PUBLICATIONS

Soares et al., "A Computational Model for Predicting the Effect of Tire Configuration on Asphaltic Pavement Life," *Road Materials and Pavement Design*, 2008, 9(2), 271-289.

Souza et al., "Multiscale model for predicting damage evolution in composites due to impact loading," *Composites Science and Technology*, 2008, 68(13):2624-2634.

Talreja, "Multi-scale modeling in damage mechanics of composite materials," *Journal of Materials Science*, 2006, 41(20):6800-6812.

\* cited by examiner

ASPHALT COMPOSITION

FEDERALLY SPONSORED RESEARCH OR DEVELOPMENT

This invention was made with government support under Grant No. W911NF-04-2-0011 awarded by the Army/ARO. The government has certain rights in the invention.

CROSS-REFERENCE TO RELATED APPLICATIONS

This application is a National Stage application under 35 U.S.C. §371 and claims benefit to International Application No. PCT/US2009/066071, having an International Filing Date of Nov. 30, 2009.

TECHNICAL FIELD

This invention is a computational method for predicting the life of asphaltic roadways as a function of loading distribution in both time and space, geometry of the roadway, material properties of the constituents, and environmental conditions.

BACKGROUND

The worldwide annual cost of roadways constructed with asphalt has been estimated at $500B, thus making asphalt arguably the most used material on the planet. Despite this fact, no robust methods are in place in any country that are capable of accurately predicting the life of a roadway constructed from asphaltic pavement as a function of loads, geometry of the roadway, material properties of the pavement, and environmental conditions. Such a method would have the potential to reduce the cost of paving with asphalt by perhaps tens of billions of dollars annually with improved performance and attendant safety.

SUMMARY

The disclosure provides a computational method for predicting roadway failure due to degradation of the roadway over time as a function of the input loads, the roadway geometry, the material properties of the constituents in the asphaltic pavement, the shape, distribution, orientation and volume fractions of the constituents, and environmental conditions. The unique and new feature of the method is that it employs all of the following physically based predictive methodologies simultaneously:
1. Viscoelastic properties of the asphaltic matrix
2. Nonlinear viscoelastic crack extension at both the local (aggregate) and global (roadway) scales
3. Temperature dependence of constituent material properties
4. A multiscale algorithm that is capable of predicting the interaction between cracks on the local and global scales
5. Ability to account for arbitrary spatial and time dependent distributions of tire loadings
6. Ability to account for any geometry of the roadway
7. The multiscale algorithm results in the ability to predict roadway as a function of asphaltic pavement mix properties, such as aggregate volume fraction, angularity, size and spatial distribution, and orientation at the constituent scale Clearly, the ability to account for all of the phenomena described above will result in a method that is capable of being utilized as an accurate tool for designing improved asphaltic roadways

CURRENT STATE OF THE ART

Current state-of-the-art methods for predicting performance behavior of asphalt concrete mixtures and pavement structures are generally based on two mechanics approaches: continuum damage mechanics approach and micromechanical approach.

The continuum damage models have been widely used and demonstrated great success in predicting structural degradation of asphalt mixtures and pavement structures due to damage. By representing the damaged body as a homogeneous continuum, the state of damage is quantified by damage parameters so-called internal state variables within the context of the thermodynamics of irreversible processes. The damage parameters are selected somewhat arbitrarily and determined usually by fitting damage evolution characteristics to the available laboratory performance test results. The continuum damage models thus provide a simplicity and efficiency to the modeling of macroscopic mechanical behavior of materials and structures with distributed damage. These models, therefore, have shown limitations as they do not account for the explicit microstructure distribution in the mixtures and hypothesize that all damage in the mixtures can be averaged and represented by the phenomenological internal state variables. This infers that the approach is incapable of predicting detailed energy dissipation mechanisms and damage evolution characteristics based on the underlying physics of the damage which is mostly controlled by the interactions of mixture constituents. Furthermore, new tests must be performed whenever mixture constituents or applied loading conditions are changed. The time and costs associated with this technique limit its usability to select materials and control design variables such that the microstructure distribution is optimized and damage is minimized.

In the micromechanics approach, the aforementioned shortcomings of continuum damage mechanics approaches can be overcome to a certain extent, since the micromechanics modeling approach directly accounts for the effect of mixture heterogeneity by dealing with mixture constituents separately. Furthermore, with the aid of computational techniques such as the finite element method and the discrete element method, the approach has successfully simulated geometric heterogeneity and predicted stiffness reduction of mixtures due to damage and fracture of individual constituents. However, most of micromechanical models currently available are still limited to provide realistic information about the macroscopic constitutive framework because of the intrinsic complexity of the asphalt mixture microstructure and the microscopic mechanisms associated with interactions among the heterogeneities. Furthermore, because of technical challenges, the majority of micromechanics models did not take into account either material inelasticity (e.g. viscoelasticity) or rate-dependent nonlinear damage growth (including energy dissipation due to micro/macro cracking) that are commonly observed phenomena in asphaltic composites. Another big challenge of the micromechanics modeling is computational effort. Considering thousands of irregularly shaped, randomly oriented aggregate particles, along with thousands of potential cracking sites, a highly refined mesh with a huge degree of freedom is necessary to model global pavement-scale, which results in an impractical computational cost.

In summary, the currently used methods for predicting life of asphaltic roadways all suffer from one or more of the following shortcomings:

1. They are semi-empirical
2. They make physical approximations that are not supported by observations
3. They do not accurately account for energy dissipation via viscoelasticity and/or plasticity
4. They do not account for energy dissipation due to crack growth at both the global and the local scales
5. They do not account for interactions between global and local cracks
6. They are not capable of accounting for input design variables at the local scale (such as fines, constituent volume fractions, aggregate angularity, particle orientation, size, and spatial distribution, etc.)
7. They cannot account for the effects of variations in tire loading in both space and time While not all of the currently available methodologies suffer from all of the above shortcomings, they all suffer from at least one or more of them. Therefore, there is a pressing need for reliable models that can account for the microstructural details but with only a fair amount of computational effort.

The multiscale modeling approach disclosed herein takes advantage of the strengths of both micromechanics and continuum damage mechanics, that is, the ability of the micromechanical model to describe mixture behavior using local scale component material properties and that of the continuum damage model to describe the global scale stress-strain behavior of the pavement materials. The currently proposed method thus overcomes all of these challenges, which renders it a robust tool for modeling asphaltic pavement life.

DESCRIPTION OF THE METHOD

The method proceeds from the fundamental assumption that failure of asphaltic roadways occurs due to the accumulation of a series of interconnected energy dissipating events. These include the dissipation of energy in the asphaltic mastic due to material viscoelasticity (such as polymer chain sliding), the accumulation of local cracks between the mastic and the aggregate, the development and propagation of global cracks that can be seen with the naked eye on the surface of the roadway, and chemical changes due to environment and load accumulation over time. The method uses a finite element formulation to account for spatial variations in the state variables (stresses, strains, and displacements), and the evolution of cracks, both local scale and global scale. The evolution of cracking is accounted for in the formulation via a micromechanically based nonlinear viscoelastic cohesive zone model previously developed by one of the inventors and collaborators. Through the deployment of this algorithm, the method has the capability to predict the evolution of the thermomechanical response of the roadway to the input conditions over time. Using existing failure criteria, this evolving picture of the roadway is then utilized to predict when the roadway will fail due to typical failure mechanisms such as: rutting, reflective thermal cracking, rutting/surface cracking; and environmental degradation.

In order to account for the fact that cracks develop on widely differing length scales in asphaltic pavement, the method utilizes a totally new and ingenious approach developed by the inventors called herein multisealing. While this term is often utilized by other researchers, the context of this term in the current application is different than that utilized by other researchers. This approach essentially consists of utilizing global finite element meshes wherever global scale cracks are expected, and local finite element meshes wherever local scale cracks are predicted. These global and local analyses are two way coupled via the deployment of mathematically rigorous homogenization theorems also previously developed by the inventors and coworkers. This approach is described conceptually in FIG. 1, wherein three simultaneous length scales are shown.

Figure 2:
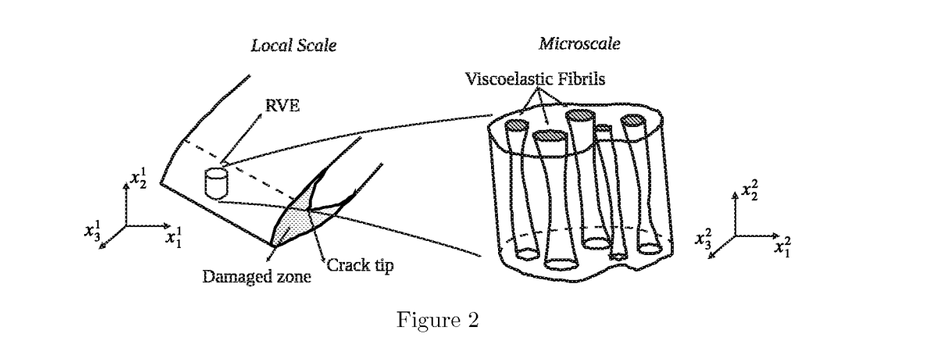
FIG. 2 contains a schematic representation of a cohesive zone.

The smallest length scale (called the micro-scale) is associated with the cohesive zones wherein cracks initiate and grow. A depiction of this length scale is shown in FIG. 2. This portion of the method has been developed by the inventors (and coworkers), and is entirely analytical.

The remaining two length scales in the figure denote the length scale of the typical aggregate dimension (local scale), and the roadway dimension (global scale). These two length scales are modeled concomitantly by coupled finite element codes that simulate the response of the roadway on the scales shown in FIG. 3, and the codes have the capability to simulate the evolution of cracks on both length scales using the cohesive zone model briefly described above.

Figure 3:
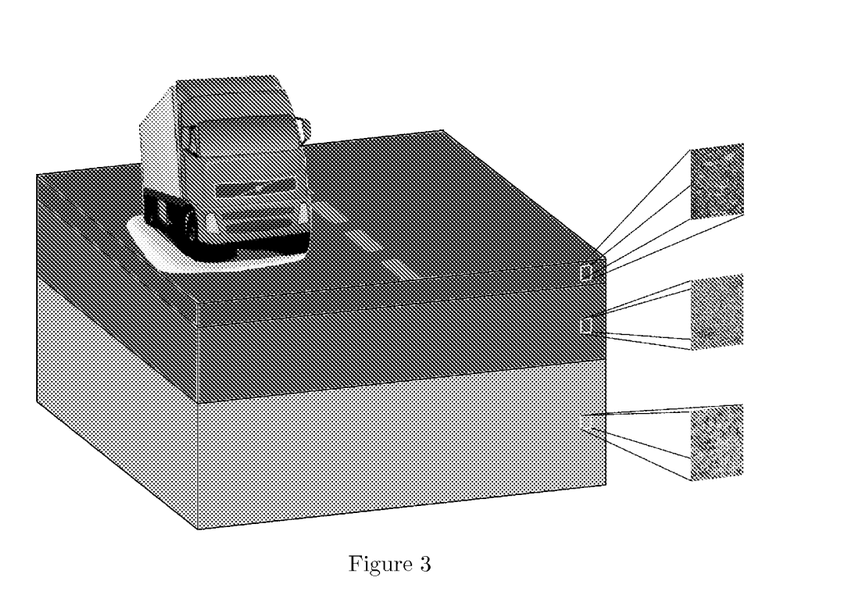
FIG. 3 contains an illustration of multiple scales of a roadway.
Figure 4:
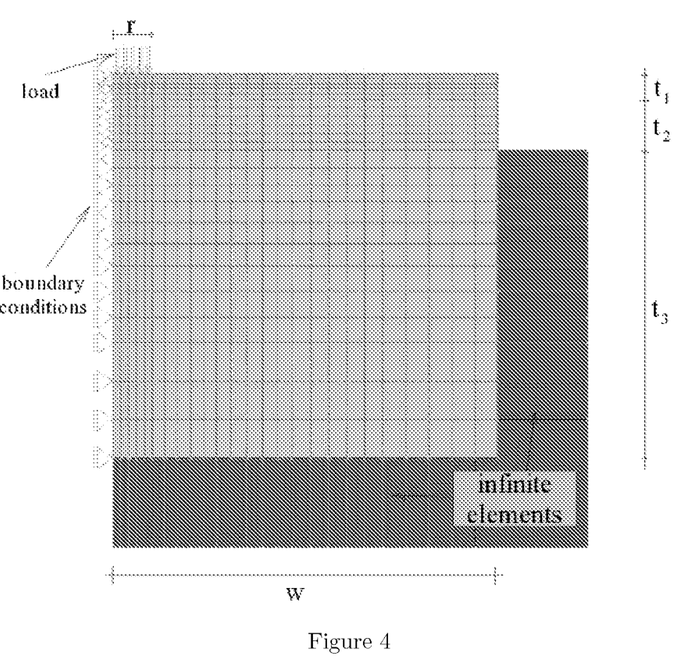
FIG. 4 contains a two-dimensional representation (and FE mesh) of a roadway.

When this algorithm is applied to a typical roadway simulation in two dimensions, the general representation shown in FIG. 3, results in the depiction shown in FIG. 4.

Figure 5:
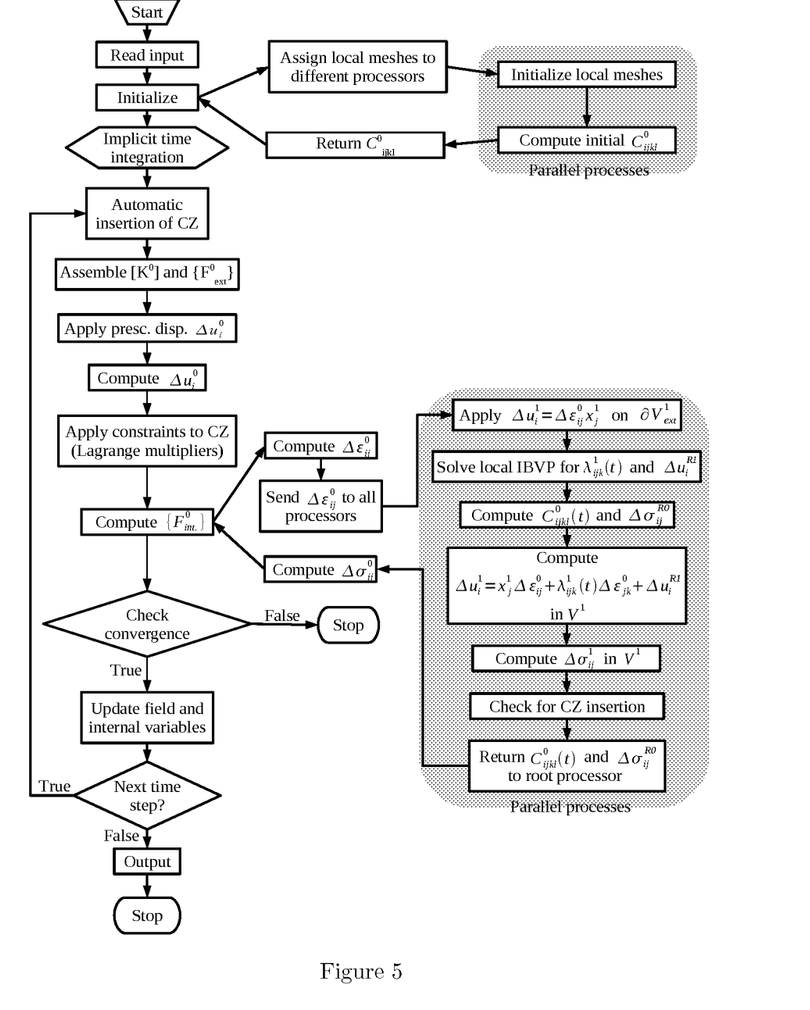
FIG. 5 contains a method flowchart.

A simplified flowchart of the multiscale finite element code is shown in FIG. 5, wherein it can be seen that the global scale and local scale computations are two-way coupled, thus producing an algorithm in which local scale objects (such as aggregate) affect the global scale response, and vice versa.

The resulting model has been cast into a user friendly format in which cyclic loading with an arbitrarily imposed surface traction distribution (due to tires or other imposed loadings) can be applied as an input. Furthermore, the algorithm can be used to construct a geometric model of the roadway, as shown in FIG. 3. Fracture properties of the cohesive zones are quite easily implemented.

A user can input one or more parameter values relating to vehicular forces applied to an asphalt surface of a roadway into one or more graphical user interfaces (GUIs). Such GUIs can be part of a front end for the integrated software package. A front end feeds user inputs from the GUI into a back end for the integrated software package. The purpose of the back end would be to perform computations of, for instance, roadway lifetime, corresponding to the roadway model using the parameters.

Figure 6:
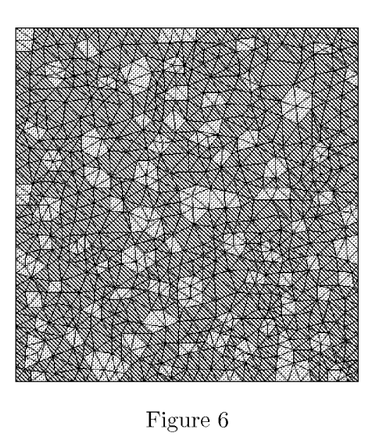
FIG. 6 contains a two-dimensional finite element mesh of the a close-up view of a roadway (local scale).

FIG. 4 shows a typical global scale mesh constructed with the code for purposes of performing a two dimensional simulation of a typical roadway. FIG. 6 shows a close-up view of the local scale mesh, with mastic and aggregate depicted in different colors. Note that these local scale meshes are repeated at all locations throughout the asphaltic layer of the roadway, thus producing hundreds of local scale meshes embedded within the single global scale mesh. The resulting algorithm is highly computationally intensive, and is most efficiently utilized on a massively parallel mainframe computer due to time constraints resulting from the time-stepping nature of the algorithm.

The results of the time-stepping scheme are that all of the resulting state variables (stresses, strains, displacements, and evolving cracks) are modeled as continuous functions of time and space. In particular, the displacement history at every point in the roadway is modeled over the life of the roadway due to the cyclic load history imposed by vehicular traffic. When exported to the proper visualization tools, these output state variables can be used to plot the time history of the entire roadway as a function of all of the input design variables. For example, a road designer could make successive predictions of the life of a roadway subjected to specific traffic conditions as a function of the aggregate volume fraction or the average aggregate particle size. Such capabilities do not currently exist.

Figure 7:
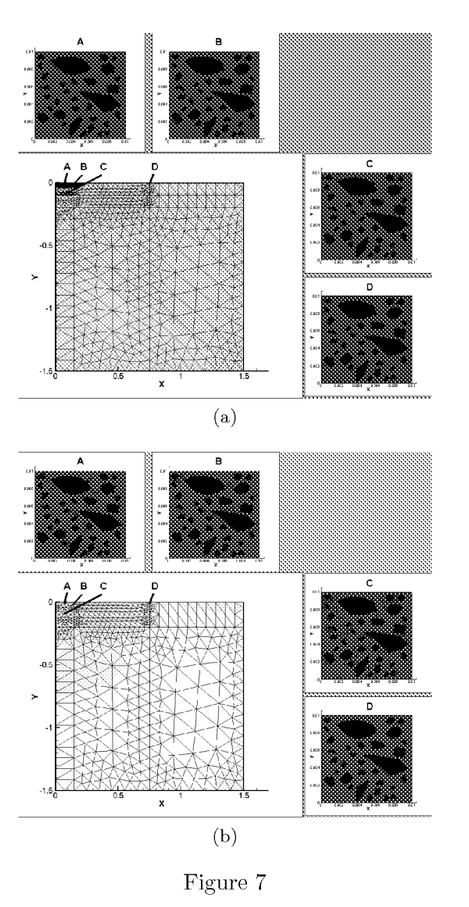
FIG. 7 contains a multiscale simulation of an asphalt pavement where excessive microcracking occurred, thus indicating failure of the pavement.

Finally, using currently available failure criteria for different failure modes, film clips of the evolution of the roadway are used within a post-processing algorithm to predict when the roadway will fail. FIG. 7 presents an example of a simulation where excessive microcracking has occurred thus indicating that the pavement is close to failure.

DETAILED DESCRIPTION OF THE METHOD

Figure 1:
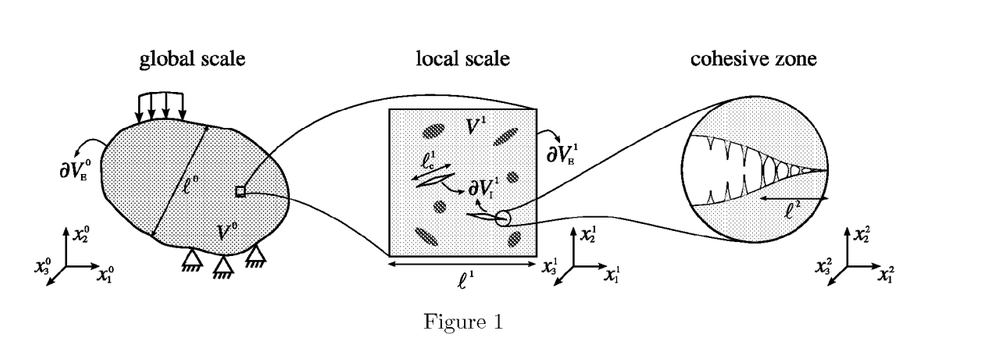
FIG. 1 contains a schematic representation of a three scale Initial Boundary Value Problem (IBVP).

FIG. 1 presents a schematic depiction of a three scale Initial Boundary Value Problem (IBVP) of a roadway. In this figure, superscripts are used to denote the scale index whereas subscripts are used to denote the conventional rectilinear coordinate system. The problem of interest (roadway) is referred as scale 0 and considered to be statistically homogeneous. The local scale object (Representative Volume Element—RVE), referred as scale 1, on the other hand, is heterogeneous. Various sources of heterogeneity can be considered such as aggregates, voids, cracks, additives and others. The cohesive zone ahead of crack tips is herein considered to be small enough so it can be treated as a third scale (scale 2). The third scale has however been analytically solved using homogenization techniques and considering some simplifications in order to produce a homogenized traction-displacement relationship for the cohesive zone. $V^\mu$, $\partial V_E^\mu$ and $\partial V_I^\mu$ denote the volume, the external and the internal boundary surfaces of the object at scale $\mu$, respectively. The length scale associated with the object and with the cracks at scale $\mu$ are respectively denoted by $l^\mu$ and $l_c^\mu$.

7.1 Multiscale Approach

The method presented herein is described in terms of infinitesimal kinematics in order to simplify the constitutive material modeling, but it can be extended to finite deformations with careful attention to the description of the cohesive zone deformation and constitutive law.

7.1.1 Micro Scale—Scale 2

Beginning with the smallest scale considered in the model, a micromechanical viscoelastic cohesive zone model is used to describe the fracture of behavior of asphalt materials. The micromechanical viscoelastic cohesive zone model is postulated to be represented by a fibrillated zone that is small compared to the total cohesive zone area, as shown in FIG. 2. This model is inherently two scale in nature in that it utilizes the solution to a microscale continuum mechanics problem, together with a homogenization theorem to produce a cohesive zone model on the next larger length scale. Furthermore, this model has also been shown to be consistent with the fact that the cohesive zone requires a nonstationary critical energy release rate in order for a crack to propagate.

The Initial Boundary Value Problem (IBVP) for scale 2 is thus given by $$\sigma_{ji,j}^2 = 0 \text{ in } V^2 \tag{1}$$

$$\sigma_{ij}^2 = \sigma_{ji}^2 \text{ in } V^2 \tag{2}$$

$$\varepsilon_{ij}^2 = \frac{1}{2}(u_{i,j}^2 + u_{j,i}^2) \text{ in } V^2 \tag{3}$$

$$\sigma_{ij}^2(x_p^2, t) = \int_{-\infty}^t C_{ijkl}^2(x_p^2, t - \tau) \frac{\partial \varepsilon_{kl}^2(x_p^2, \tau)}{\partial \tau} d\tau \text{ in } V^2 \tag{4}$$

Adjoining appropriate boundary conditions, the IBVP above is said to be well-posed. Taking a closer look into the mechanics ahead of the crack tip, a locally averaged solution of the cohesive zone IBVP (scale 2) can be obtained analytically, so the following traction-displacement relationship results for the viscoelastic cohesive zones on the next larger scale (scale 1):

$$t_i^1(t) = \frac{1}{\lambda^1} \frac{[u_i^1]}{\delta_i^{*1}} [1 - \alpha^1(t)] \left\{ \sigma_i^{f1} + \int_{t_0}^t E_{CZ}^1(t-\tau) \frac{\partial \lambda^1}{\partial \tau} d\tau \right\} \text{ on } \partial V_{CZ}^1 \tag{5}$$

where $t_i^1$ is the traction vector acting on the cohesive zone boundary, $[u_i^1]$ is the cohesive zone opening displacement, $\delta_i^{*1}$ are empirical material length parameters which typically reflect a length scale intrinsic to the cohesive zone, $\sigma_i^{f1}$ is the required stress level to initiate damage, $E_{CZ}^1$ is the uniaxial relaxation modulus of a single fibril in the cohesive zone, $\alpha^1(t)$ is the internal damage parameter reflecting the area fraction of voids with respect to the cross-sectional area of the idealized cohesive zone, and $\lambda^1$ is the Euclidean norm of the cohesive zone opening displacements:

$$\lambda^1 = \sqrt{\left(\frac{[u_r^1]}{\delta_r^{*1}}\right)^2 + \left(\frac{[u_n^1]}{\delta_n^{*1}}\right)^2 + \left(\frac{[u_s^1]}{\delta_s^{*1}}\right)^2} \tag{6}$$

where n indicates normal direction and r and s indicate tangential directions.

7.1.2 Local Scale—Scale 1

The IBVP for the local RVE is well-posed by uniform initial boundary conditions adjoined to the following set of equations:

$$\sigma_{ji,j}^1 = 0 \text{ in } V^1 \tag{7}$$

$$\sigma_{ij}^1 = \sigma_{ji}^1 \text{ in } V^1 \tag{8}$$

$$\varepsilon_{ij}^1 = \frac{1}{2}(u_{i,j}^1 + u_{j,i}^1) \text{ in } V^1 \tag{9}$$

$$\sigma_{ij}^1(t) = \Omega_{\tau=-\infty}^{\tau=t}\{\varepsilon_{kl}^1(\tau)\} \text{ in } V^1 \tag{10}$$

$$G_i^1 \geq G_{ci}^1 \Rightarrow \frac{\partial}{\partial t}(\partial V_I^1) > 0 \text{ in } V^1 \tag{11}$$

where equation 11 describes the fracture criterion, $G_i^1$ is the fracture energy release rate at a particular position in the local scale, $G_{ci}^1$ is the critical energy release rate of the material at that particular position and the index i refers to the mode of fracture. This form of the fracture criterion will herein be naturally replaced by the cohesive zone model given in Eq. It can be shown that equation 5 is mathematically equivalent to equation 11. Even though the mathematical proof is not shown herein, conceptually, as the damage parameter $\alpha^1(t)$ reaches unity, the traction vector $t_i^1(t)$ becomes zero valued, meaning that a free surface has been created or, equivalently, a crack has propagated, $$\frac{\partial}{\partial t}(\partial V_I^1) > 0.$$

Furthermore, the functional $\Omega_{\tau=-\infty}^{\tau=t}$ describing the constitutive behavior of each particle at the local position $x_i^1$ is known a priori for all constituents. In the current study, this functional can represent linear elastic or linear viscoelastic behavior depending on the constituent. For linear viscoelastic materials, functionals of single integral type are considered:

$$\sigma_{ij}^1(x_p^1, t) = \int_{-\infty}^{t} C_{ijkl}^1(x_p^1, t-\tau) \frac{\partial \varepsilon_{kl}^1(x_p^1, \tau)}{\partial \tau} d\tau \tag{12}$$

where $x_p^1$ denotes the particle under consideration.

7.1.3 Global Scale—Scale 0

The mechanical IBVP for the global object (roadway) can then be well-posed by appropriate initial boundary conditions and a set of equations: conservation of linear and angular momentum (equations 13 and 14), infinitesimal strain-displacement relations (equation 15) and constitutive equations (equation 16).

$$\sigma_{ji,j}^0 = 0 \text{ in } V^0 \tag{13}$$

where Einstein's indicial notation has been used, $\sigma_{ij}^0$ is the Cauchy stress tensor. Note that inertial effects and body forces have been neglected since the roadway problem will be considered quasi-static.

$$\sigma_{ij}^0 = \sigma_{ji}^0 \text{ in } V^0 \tag{14}$$

$$\varepsilon_{ij}^0 = \frac{1}{2}(u_{i,j}^0 + u_{j,i}^0) \text{ in } V^0 \tag{15}$$

where $\epsilon_{ij}^0$ is the infinitesimal strain tensor defined on the global scale and $u_i^0$ is the displacement vector at a certain location $x_i^0$ inside the statistically homogeneous object at the global length scale and at a certain time t.

$$\sigma_{ij}^0(x_m^0, t) = \overline{\Omega}_{\tau=-\infty}^{\tau=t}\{\epsilon_{kl}^0(x_m^0, \tau)\} \text{ in } V^0 \tag{16}$$

where $\overline{\Omega}_{\tau=-\infty}^{\tau=t}$ is a functional describing the constitutive behavior at each position $x_i^0$ in the object at the global scale, which may account for damage accumulation and history dependent effects, such as viscoelasticity, and is obtained by locally averaging the constitutive behavior of the RVE corresponding to that particular global scale position.

7.1.4 Two-Way Coupling Between Global and Local Scales

In the most general sense, the local RVE should obey the same set of governing equations as the global object. However, complex inhomogeneous boundary conditions might have to be applied at the RVE boundaries in order to satisfy that condition. Therefore some simplifications are assumed so that the complexities may be neglected and one may seek an approximate, but satisfactorily accurate, solution for the problem. The first assumption is that the physical length scales are widely separated, allowing the use of spatially homogeneous boundary conditions (uniform boundary tractions or linear boundary displacements) and simplifying the homogenization relationships connecting global and local scales:

$$l^0 >> l^1 >> l^2 \tag{17}$$

The most common boundary conditions applied to the boundaries of the RVE are the linear displacement, constant tractions, periodic displacement and anti-periodic tractions. Any choice of imposed boundary conditions should however satisfy the Hill condition which requires that the total work-rate per unit reference volume (or the virtual work) at the global (macro) scale be equal to the total work-rate per unit reference volume on the local (micro) scale:

$$\sigma_{ij}^0 \dot{\varepsilon}_{ij}^0 = \frac{1}{V^1} \int_{V^1} \sigma_{ij}^1 \dot{\varepsilon}_{ij}^1 dV \tag{18}$$

The second assumption is that the local length scale is much larger than the length scale associated with cracks at the local scale 1, thus mitigating the possibility of statistical inhomogeneity at the local scale but narrowing the range of problems for which the method can generate accurate predictions:

$$l^1 >> l_c^1 \tag{19}$$

For the cases where the previous assumptions are valid, one can show that the relations connecting the global and local scales are given by the following (mean field) homogenization principles:

$$\overline{\varepsilon}_{ij}^1 = \frac{1}{V^1} \int_{V^1} \varepsilon_{ij}^1 dV = \varepsilon_{ij}^0 + \alpha_{ij}^0 \tag{20}$$

$$\varepsilon_{ij}^0 = \frac{1}{V^1} \int_{\partial V_E^1} \frac{1}{2}(u_i^1 n_j^1 + u_j^1 n_i^1) dS \tag{21}$$

$$\alpha_{ij}^0 = \frac{1}{V^1} \int_{\partial V_I^1} \frac{1}{2}(u_i^1 n_j^1 + u_j^1 n_i^1) dS \tag{22}$$

$$\sigma_{ij}^0 = \frac{1}{V^1} \int_{\partial V_E^1} \sigma_{ki}^1 n_k^1 x_j^1 dS = \frac{1}{V^1} \int_{V^1} \sigma_{ij}^1 dV = \overline{\sigma}_{ij}^1 \tag{23}$$

where $n_i^1$ is the outward unit normal vector to the external or internal boundary, $\partial V_E^1$ or $\partial V_I^1$, of the RVE.

From equation 21, one can observe that the strain tensor in the global scale is equal to the external boundary average of the displacement vector on the local scale, which differs from the volume average of the strain tensor by the internal boundary average of the displacement vector, $\alpha_{ij}^0$. Note, however, that in the case where there is no separation along the internal boundaries of the RVE, no voids or cracks, $\alpha_{ij}^0$ is zero, so that $\alpha_{ij}^0$ can be regarded as an averaged measure of damage.

On the other hand, equation 23 allows us to conclude that the external boundary average of the traction vector, $l_i^1$, is equal to the volume average of the stress tensor. This is true only if the traction vector over the internal boundary surfaces is zero (free surfaces, cracks) or self-equilibrating (cohesive zones).

The use of equations 21 and 23 is termed a mean field theory of homogenization because the behavior of the global object is determined only in terms of the mean stress and strain tensors evaluated at the external boundary of the local RVE. It is important to note that the assumption that $\epsilon_{ij}^0$ is spatially uniform along the external boundary of the RVE breaks down in regions of high gradients, such as in the vicinity of cracks or where the size of the RVE is comparable to the global length scale.

For quasi-static problems, such as the life prediction of a roadway, the computation of the homogenized constitutive tensor is required in order to correctly calculate the tangent stiffness matrix. In other words, one is required to compute the homogenized functional $\overline{\Omega}_{\tau=-\infty}^{\tau=t}$. If one uses an incremental solution scheme, however, it is preferable to seek an incremental constitutive equation of the form:

$$\Delta \sigma_{ij}^0 = \overline{\Omega}'(\Delta \epsilon_{kl}^0) \tag{24}$$

7.2 Incremental Formulation for Time Dependence

General purpose Finite Element codes usually employ incremental algorithms for solving IBVP's. When the IBVP is time and/or history dependent, incrementalization is necessary to allow integration of the governing equations, at least in an approximate manner. This disclosure presents an incremental homogenization scheme for viscoelastic solids containing cracks suitable for multiscale computational codes for predicting life of asphaltic roadways.

Most approaches proposed in the literature to compute the homogenized tangent constitutive tensor are based on purely numerical techniques. For example, some researchers employ the technique of condensation of the total RVE stiffness. Others use the approximate numerical differentiation technique, which requires the solution of four (2D) or six (3D) IBVP's for every solution step. Basically, numerical constitutive tests are performed by applying unit deformation in every mode. Note that these works do not consider cracking or viscoelasticity. The approach to be presented in this disclosure, on the other hand, is based on continuum mechanics homogenization principles and allows the computation of the full homogenized anisotropic tangent constitutive tensor of viscoelastic solids with evolving cracks by solving the IBVP only once at each coordinate location and for each time step, which greatly reduces the required amount of computational time. This procedure is presented in a scientific journal article by the first two inventors of this disclosure.

As will be shown, the introduction of a localization quantity relating the local displacement field to the deformation on the external boundary of the RVE is the key feature that allows the computation of the full homogenized anisotropic tangent constitutive tensor by solving the IBVP only once. For the problem at hand, first assume that the stress tensor at both global and local scales can be written in incremental form:

$$\sigma_{ij}^0(t+\Delta t) = \sigma_{ij}^0(t) + \Delta \sigma_{ij}^0 \tag{25}$$

$$\sigma_{ij}^1(t+\Delta t) = \sigma_{ij}^1(t) + \Delta \sigma_{ij}^1 \tag{26}$$

Therefore, $$\sigma_{ij}^0(t) = \frac{1}{V^1} \int_{V^1} \sigma_{ij}^1(t) dV \tag{27}$$

$$\Delta \sigma_{ij}^0 = \frac{1}{V^1} \int_{V^1} \Delta \sigma_{ij}^1 dV \tag{28}$$

A very stable and accurate incrementalization scheme has been proposed by one of the inventors (and collaborators) which can model viscoelastic constitutive behavior of single integral type and for which the relaxation moduli can be represented by a Prony series:

$$C_{ijkl}^1(t) = C_{ijkl_\infty}^1 + \sum_{m=1}^{M_{ijkl}^1} C_{ijkl_m}^1 e^{-t/\rho_{ijkl_m}^1} \text{ (no sum on } i, j, k, l) \tag{29}$$

where $C_{ijkl_\infty}^1$ are the long term moduli, $C_{ijkl_m}^1$ are the moduli coefficients and $M_{ijkl}^1$ is the number of Prony terms necessary to accurately describe the material relaxation moduli, and $\rho_{ijkl_m}^1$ are the so-called relaxation times given by, $$\rho_{ijkl_m}^1 = \eta_{ijkl_m}^1 / C_{ijkl_m}^1 \text{ (no sum on } i, j, k, l) \tag{30}$$

where $\eta_{ijkl_m}^1$ are viscosity terms.

If one assumes that the strain rate is constant for each time step, the following incremental constitutive equation can be obtained:

$$\Delta \sigma_{ij}^1 = C_{ijkl}'^1 \Delta \epsilon_{kl}^1 + \Delta \sigma_{ij}^{R1} \tag{31}$$

where $$C_{ijkl}'^1 \equiv C_{ijkl_\infty}^1 + \frac{1}{\Delta t} \sum_{m=1}^{M_{ijkl}^1} \eta_{ijkl_m}^1 \left(1 - e^{-\Delta t/\rho_{ijkl_m}^1}\right) \text{ (no sum on } i, j, k, l) \tag{32}$$

$$\Delta \sigma_{ij}^{R1} = -\sum_{k=1}^{3} \sum_{l=1}^{3} A_{ijkl}^1 \tag{33}$$

$$A_{ijkl}^1 = \sum_{m=1}^{M_{ijkl}^1} \left(1 - e^{-\Delta t/\rho_{ijkl_m}^1}\right) S_{ijkl_m}^1(t) \text{ (no sum on } i, j, k, l) \tag{34}$$

$$S_{ijkl_m}^1(t) = e^{-\Delta t/\rho_{ijkl_m}^1} S_{ijkl_m}^1(t - \Delta t) + \eta_{ijkl_m}^1 \frac{\Delta \epsilon_{kl}^1}{\Delta t} \left(1 - e^{-\Delta t/\rho_{ijkl_m}^1}\right) \text{ (no sum on } i, j, k, l) \tag{35}$$

where t denotes the previous time step and $\Delta \epsilon_{kl}^1/\Delta t$ is determined from the previous time step t. Note that all time dependence in the material behavior resides in $\Delta \sigma_{ij}^{R1}$ which is recursively computed at each time step. Also note that the values of $S_{ijkl_m}^1$ from the previous time step must be stored so that $S_{ijkl_m}^1(t)$ can be determined recursively. Moreover, $S_{ijk_m}^1 = 0$ for $t \leq 0$. Further details about the incrementalization of viscoelastic constitutive equations can found in the specialized literature.

The same can be done for the cohesive zone traction-displacement relation. Following the same procedure, one can show that the cohesive zone constitutive equation can be written in the following incremental form:

$$t_i^1(t + \Delta t) = t_i^1(t) + \Delta t_i^1 \tag{36}$$

$$\Delta t_i^1 = k_{ij}^1 \Delta[u_j^1] + \Delta t_i^{R1} \tag{37}$$

where $$k_{ij}^1 = \frac{[1 - \alpha^1(t + \Delta t)]}{\delta_i^{*1}} E'^1 \delta_{ij} \text{ (no sum on } i) \tag{38}$$

$$E'^1 \equiv E_\infty^1 + \frac{1}{\Delta t} \sum_{j=1}^{M^1} \eta_j^1 (1 - e^{-\Delta t/\rho_j^1}) \tag{39}$$

-continued $$\Delta t_i^{R1} = \frac{[1-\alpha^1(t+\Delta t)]}{\delta_i^{*1}} \left[ -\sum_{j=1}^{M^1} (1-e^{-\Delta t/\rho_j^1}) s_{ij}^1(t) \right] - \frac{\Delta \alpha^1}{\delta_i^{*1}} \left\{ E_\infty^1 [u_i^1(t)] + \sum_{j=1}^{M^1} s_{ij}^1(t) \right\} - \Delta \alpha^1 \sigma_i^{f1} \quad \text{(no sum on } i\text{)} \quad (40)$$

$$S_{ij}^1(t) = e^{-\Delta t/\rho_j^1} S_{ij}^1(t-\Delta t) + \eta_j^1 \frac{\Delta[u_i^1]}{\Delta t} (1-e^{-\Delta t/\rho_j^1}) \quad \text{(no sum on } j\text{)} \quad (41)$$

where $\delta_{ij}$ is the Kronecker delta, $M^1$ is the number of Prony terms necessary to accurately describe the uniaxial relaxation modulus of a single fibril in the cohesive zone, and $\Delta[u_i^1]$ is the increment of the displacement jump across the cohesive zone boundaries, which rate is assumed to be constant over each time step.

Now assume that the constitutive behavior of the global object can be approximated by an incremental form similar to equation 31:

$$\Delta \sigma_{ij}^0 = C_{ijkl}^0(t) \Delta \epsilon_{kl}^0 + \Delta \sigma_{ij}^{R0} \quad (42)$$

where $C_{ijkl}^0(t)$ is the instantaneous (tangent) constitutive tensor evaluated at the previous time step t which is a function of time through its dependence on the amount of damage accumulated at the local RVE, thus producing a nonlinear behavior at the global scale. Substituting equations 42 and 31 into 28, gives:

$$C_{ijkl}^0 \Delta \varepsilon_{kl}^0 + \Delta \sigma_{ij}^{R0} = \frac{1}{V^1} \int_{V^1} (C_{ijkl}'^1 \Delta \varepsilon_{kl}^1 + \Delta \sigma_{ij}^{R1}) dV \quad (43)$$

where $C_{ijkl}^0(t)$ is now written as $C_{ijkl}^0$ for the shortness of notation. Now it is necessary to solve the above equation for $C_{ijkl}^0$. The key to the following development is to relate the field variables of the local scale to the external boundary average quantities corresponding to field variables of the global scale. Using the concept of localization tensors, it is herein assumed that the local displacement field can be related to the global strain tensor (external boundary average of the local displacement field) according to:

$$u_i^1(t) = x_j^1 \epsilon_{ij}^0(t) + \lambda_{ijk}^1(t) \epsilon_{jk}^0(t) \text{ in } V^1 \quad (44)$$

where $\lambda_{ijk}^1$ is called the localization tensor. The first term in equation 44 corresponds to a homogeneous displacement field which would be experienced by the RVE if it was a homogeneous material. The second term, on the other hand, represents the contribution to the local displacement field due to the history dependent constitutive behavior and the existence of local asperities and internal boundaries, including cracks and cohesive zones. Note that the displacement vector is chosen to be described in such a manner because it is generally used as the primary variable in finite element formulations. Some researchers have used a fourth order strain localization tensor which relates $\epsilon_{kl}^1$ to $\epsilon_{kl}^0$. This approach may be sometimes impractical or inconvenient, especially when using the finite element method to solve the local IBVP.

Note that the same procedure can be used in the case of periodic displacement boundary conditions. It can be shown that equation I is actually equivalent to the representation usually admitted in the asymptotic homogenization theory, say $u_i^1 = \chi_{ijk}^1 \epsilon_{jk}^0$, where $\chi_{ijk}^1$ is the so-called influence function. Note that, in the referred works, $\chi_{ijk}^1$ is not assumed to be a function of time because neither viscoelasticity nor cracking are considered.

Linearizing the local scale displacement field gives:

$$u_i^1(t+\Delta t) = u_i^1(t) + \frac{\partial u_i^1(t)}{\partial t} \Delta t \quad (45)$$

From equation 44 and the chain rule of differentiation, one can show that:

$$\frac{\partial u_i^1(t)}{\partial t} = x_j^1 \frac{\partial \varepsilon_{ij}^0(t)}{\partial t} + \lambda_{ijk}^1(t) \frac{\partial \varepsilon_{jk}^0(t)}{\partial t} + \frac{\partial \lambda_{ijk}^1(t)}{\partial t} \varepsilon_{jk}^0(t) \quad (46)$$

It is important to note that, from the incrementalization of the global and local viscoelastic constitutive equations, $\partial \epsilon_{ij}^0(t)/\partial t$ as well as $\partial u_i^1(t)/\partial t$ have been assumed to be constant over the time step. However, no assumption will be made about the behavior of $\lambda_{ijk}^1(t)$ and $\partial \lambda_{ijk}^1(t)/\partial t$ in order to maintain the same degree of accuracy, but equation 46 is redefined as follows:

$$\frac{\partial u_i^1(t)}{\partial t} = x_j^1 \frac{\partial \varepsilon_{ij}^0(t)}{\partial t} + \lambda_{ijk}^1(t) \frac{\partial \varepsilon_{jk}^0(t)}{\partial t} + \frac{\partial u_i^{R1}(t)}{\partial t} \quad (47)$$

where $$\frac{\partial u_i^{R1}(t)}{\partial t} \equiv \frac{\partial \lambda_{ijk}^1(t)}{\partial t} \varepsilon_{jk}^0(t) \quad (48)$$

and one can show from the previous assumptions that $\partial u_i^{R1}(t)/\partial t$ is constant over the time step, thus giving:

$$\Delta u_i^1 = x_j^1 \Delta \epsilon_{ij}^0 + \lambda_{ijk}^1(t) \Delta \epsilon_{jk}^0 + \Delta u_i^{R1} \quad (49)$$

Substituting 49 into the infinitesimal strain-displacement relationship for scale 1, then into 43 yields:

$$C_{ijkl}^0 \Delta \varepsilon_{kl}^0 + \Delta \sigma_{ij}^{R0} = \frac{1}{V^1} \int_{V^1} \left\{ C_{ijkl}'^1 + C_{ijpq}'^1 \left[ \frac{1}{2} (\lambda_{pkl,q}^1 + \lambda_{qkl,p}^1) \right] \right\} dV \Delta \varepsilon_{kl}^0 + \frac{1}{V^1} \int_{V^1} (C_{ijkl}'^1 \Delta \varepsilon_{kl}^{R1} + \Delta \sigma_{ij}^{R1}) dV \quad (50)$$

where symmetry of the local constitutive tensor $C_{ijkl}^1$ and the fact that $\Delta \epsilon_{kl}^0$ is constant in $V^1$ have been used, $\lambda_{ijk,l}^1(t)$ is written as $\lambda_{ijk,l}^1$ to simplify equations, and $$\Delta \varepsilon_{ij}^{R1} \equiv \frac{1}{2} (\Delta u_{i,j}^{R1} + \Delta u_{j,i}^{R1}) \quad (51)$$

Since $\Delta \epsilon_{kl}^0$ is arbitrary, one obtains:

$$C_{ijkl}^0 = \frac{1}{V^1} \int_{V^1} \left\{ C_{ijkl}'^1 + C_{ijpq}'^1 \left[ \frac{1}{2} (\lambda_{pkl,q}^1 + \lambda_{qkl,p}^1) \right] \right\} dV \quad (52)$$

$$\Delta \sigma_{ij}^{R0} = \frac{1}{V^1} \int_{V^1} (C_{ijkl}'^1 \Delta \varepsilon_{kl}^{R1} + \Delta \sigma_{ij}^{R1}) dV \quad (53)$$

Note that the global scale tangent constitutive tensor, $C_{ijkl}^0$, is affected by heterogeneity, internal boundaries and cracks at the local scale through the localization tensor, $\lambda_{ijk}^1$, and affected by viscoelasticity through $C_{ijkl}'^1$ and $\lambda_{ijk}^1$. It is also important to note that the global scale history dependence, expressed by $\Delta\sigma_{ij}^{R0}$, also depends on the heterogeneity, internal boundaries and cracks initiated at the local scale through $\Delta u_i^{R1}$, defined by equation 48, which depends on the rate of change of $\lambda_{ijk}^1(t)$.

Also note that the homogenized tangent constitutive tensor, $C_{ijkl}^0$, is only equal to the volume average of the local scale constitutive tensor if $\lambda_{ijk}^1 = \text{constant} = 0^1$, meaning that the local scale object is actually homogeneous. Therefore, the rule of mixtures (volume average of the local scale constitutive tensor), which does not account for the localization of field variables, should be used only as a rough estimate which may be very inaccurate in some cases.

[1] Note that, in order to satisfy the displacement boundary conditions, $u_i^1(t) = x_j^1 \epsilon_{ij}^0(t)$, all components of $\lambda_{ijk}^1$ have to be zero at least on some regions of $\partial V_E^1$ (or all over $\partial V_E^1$ if no heterogeneity (cracks and inclusions) is allowed to cross the external boundary of the RVE and periodic fluctuations on $\partial V_E^1$ are null). Thus, if $\lambda_{ijk}^1$ is constant over the volume $V^1$, it has to be zero.

It can be shown that the expression for computing the homogenized tangent constitutive tensor is the same for both elastic and viscoelastic media containing cracks. The only difference is the additional homogenized incremental history dependent stress tensor that appears in the viscoelastic formulation.

It can also be shown that equation 52 is equivalent to the one obtained from the asymptotic homogenization theory for both linear elastic and elasto-plastic materials, even though cracking has not been considered in these works.

7.3 Finite Element Formulation for Spatial Dependence

The finite element formulation for the global scale IBVP follows the standard formulation presented in reference books on the subject, and in this case, an implicit time integration scheme is used to solve the global scale (roadway) IBVP.

In this section, the finite element formulation for the local IBVP is developed. For the local IBVP, one should now seek the solution for the localization tensor $\lambda_{ijk}^1(t)$ and $\Delta u_i^{R1}$ so that the displacement increments can be computed using equation 49, and $C_{ijkl}^0$ and $\Delta\sigma_{ij}^{R0}$ can be computed using equations 52 and 53, respectively.

Consider the variational form of conservation of linear momentum at the local scale, neglecting the body force vector:

$$\int_{V^1} \sigma_{ij,j}^1 \delta u_i^1 dV = 0 \tag{54}$$

From the chain rule of differentiation and conservation of angular momentum, the above equation results in:

$$\int_{V^1} (\sigma_{ji}^1 \delta u_i^1)_{,j} dV = \int_{V^1} \sigma_{ij}^1 \delta\epsilon_{ij}^1 dV \tag{55}$$

Applying the divergence theorem to the above equation at time $t+\Delta t$ and using Cauchy's formula ($t_i^1 = \sigma_{ji}^1 n_j^1$) results in:

$$\int_{V^1} \sigma_{ij}^1(t+\Delta t)\delta\epsilon_{ij}^1(t+\Delta t) dV = \tag{56}$$

$$\int_{\partial V_E^1} t_i^1(t+\Delta t)\delta u_i^1(t+\Delta t) dS + \int_{\partial V_I^1} t_i^1(t+\Delta t)\delta u_i^1(t+\Delta t) dS$$

Besides the incremental equations 26, 36 and 45, consider that the strain field can also be approximated by the following incremental form:

$$\epsilon_{ij}^1(t+\Delta t) = \epsilon_{ij}^1(t) + \Delta\epsilon_{ij}^1 \tag{57}$$

Thus, substituting into 56, but noting that the variation of $\epsilon_{ij}^1(t)$ and $u_i^1(t)$ are null because these are known quantities, yields:

$$\int_{V^1} \sigma_{ij}^1(t)\delta\Delta\epsilon_{ij}^1 dV + \int_{V^1} \Delta\sigma_{ij}^1 \delta\Delta\epsilon_{ij}^1 dV = \int_{\partial V_E^1} t_i^1(t)\delta\Delta u_i^1 dS + \tag{58}$$

$$\int_{\partial V_E^1} \Delta t_i^1 \delta\Delta u_i^1 dS + \int_{\partial V_I^1} t_i^1(t)\delta\Delta u_i^1 dS + \int_{\partial V_I^1} \Delta t_i^1 \delta\Delta u_i^1 dS$$

Also noting that, $$\int_{\partial V_E^1 + \partial V_I^1} t_i^1(t)\delta\Delta u_i^1 dS = \int_{V^1} \sigma_{ji,j}^1(t)\delta\Delta u_i^1 dV + \tag{59}$$

$$\int_{V^1} \sigma_{ji}^1(t)\delta\Delta\epsilon_{ij}^1 dV$$

$$= \int_{V^1} \sigma_{ij}^1(t)\delta\Delta\epsilon_{ij}^1 dV$$

results in:

$$\int_{V^1} \Delta\sigma_{ij}^1 \delta\Delta\epsilon_{ij}^1 dV = \int_{\partial V_E^1} \Delta t_i^1 \delta\Delta u_i^1 dS + \int_{\partial V_I^1} \Delta t_i^1 \delta\Delta u_i^1 dS \tag{60}$$

Under the circumstances where the previously discussed assumptions regarding the global and local length scales are valid, either displacements or tractions can be applied on the boundary of the RVE. If displacements are applied, then the first integral on the right-hand side of the equation above is zero because the variation of the displacement field on the external boundary is null. If tractions are applied instead, this integral is also zero because the tractions are self-equilibrated over the external boundary of the RVE. Thus, $$\int_{V^1} \Delta\sigma_{ij}^1 \delta\Delta\epsilon_{ij}^1 dV = \int_{\partial V_I^1} \Delta t_i^1 \delta\Delta u_i^1 dS + \tag{61}$$

Now notice that the virtual work done by tractions over the internal boundary (right-hand side of equation above) is zero unless there is separation along that boundary. Therefore, the integral over the internal boundaries can be reduced to an integral over cracks and cohesive zones. Since $n_{\partial V_{CZ}^1} = -n_{\partial V_I^1}$, and $\Delta t_i(n_{\partial V_{CZ}^1}) = -\Delta t_i(n_{\partial V_I^1})$, the equation above can be rewritten as:

$$\int_{V^1} \Delta\sigma_{ij}^1 \delta\Delta\epsilon_{ij}^1 dV + \int_{\partial V_{CZ}^1} \Delta t_i^1 \delta\Delta u_i^1 dS = 0 \tag{62}$$

Substituting 49 into the strain-displacement relationship at the local scale, then into 31, gives:

$$\Delta\sigma_{ij}^1 = \left\{ C_{ijkl}^1 + C_{ijpq}^1 \left[ \frac{1}{2}(\lambda_{pkl,q}^1 + \lambda_{qkl,p}^1) \right] \right\} \Delta\epsilon_{kl}^0 + C_{ijkl}^{\prime 1} \Delta\epsilon_{kl}^{R1} + \Delta\sigma_{ij}^{R1} \tag{63}$$

Also, from equation 49, $$\Delta[u_i^1] = [x_j^1 \Delta\epsilon_{ij}^0 + \lambda_{ijk}^1 \Delta\epsilon_{jk}^0 + \Delta u_i^{R1}]_{\text{surface 1}} - [x_j^1 \Delta\epsilon_{ij}^0 + \lambda_{ijk}^1 \Delta\epsilon_{jk}^0 + \Delta u_i^{R1}]_{\text{surface 2}} \tag{64}$$

or $$\Delta[u_i^1] = [\lambda_{ijk}^1|_{\text{surface 1}} - \lambda_{ijk}^1|_{\text{surface 2}}]\Delta\epsilon_{jk}^0 + [\Delta u_i^{R1}|_{\text{surface 1}} - \Delta u_i^{R1}|_{\text{surface 2}}] \tag{65}$$

where one should note that the initial coordinates, $x_i^1$, of the cohesive zone surfaces coincide.

The incremental localization field can now be discretized in space by expressing it as a function of its nodal values:

$$[\lambda^1]_e = [N^1]_e [\tilde{\lambda}^1]_e \tag{66}$$

where the above equation has been written in matrix form, $[N^1]_e$ is the matrix of nodal shape functions for each finite element, the subscript e denotes quantities defined for each finite element, and the over-tilde indicates nodal value. It is important to note that the shape functions used to interpolate $\lambda_{ijk}^1$ are the same as for the displacement field. Therefore, one can also write:

$$\{\delta\Delta u^1\}_e = [N_{CZ}^1]_e \{\delta\Delta \tilde{u}^1\}_e \text{ on } \partial V_{CZ}^1 \quad (67)$$

$$\{\Delta[u^1]\}_e = [N_{CZ}^1]_e [\tilde{\lambda}^1]_e \{\Delta\epsilon^0\}_e + [N_{CZ}^1]_e \{\Delta\tilde{u}^{R1}\}_e \quad (68)$$

$$\{\delta\Delta\epsilon^1\}_e = [B^1]_e \{\delta\Delta\tilde{u}^1\}_e \quad (69)$$

where $[B^1]_e$ is the matrix of derivatives of the shape functions with respect to the local scale spatial coordinates. Substituting equations 37, 63-69 into 62 and noting that $\delta\Delta\tilde{u}_i^1$ and $\Delta\epsilon_{ij}^0$ are arbitrary quantities results in the following two sets of linear equations:

$$[\tilde{\lambda}^1]_a = -[K^1]_a^{-1}[G^1]_a \quad (70)$$

$$\{\Delta\tilde{u}^{R1}\}_a = [K^1]_a^{-1}\{F^{R1}\}_a \quad (71)$$

where the subscript a denotes quantities assembled over the entire finite element mesh.

$$[K^1]_a = \int_{V^1}[B^1]^T[C^1][B^1]dV + \int_{\partial V_{CZ}^1}[N_{CZ}^1]^T[k_{CZ}^1][N_{CZ}^1]dS \quad (72)$$

$$[G^1]_a = \int_{V^1}[B^1]^T[C^1]dV \quad (73)$$

$$\{F^{R1}\}_a = -\{\int_{V^1}[B^1]^T\{\Delta\sigma^{R1}\}dV + \int_{\partial V_{CZ}^1}[N_{CZ}^1]^T\{\Delta t^{R1}\}dS\} \quad (74)$$

where the subscripts e have been dropped for a simpler notation.

Once $\lambda_{ijk}^1(t)$ and $\Delta u_i^{R1}$ have been obtained using equations 70 and 71, respectively, one can calculate the incremental displacements using equation 49 and compute the global scale (homogenized) tangent constitutive tensor, $C_{ijkl}^0$, and the global scale history dependent stress tensor, $\Delta\sigma_{ij}^{R0}$ from equations 52 and 53, respectively. Then standard FE procedures can be used to compute the incremental strain and stress tensors from the incremental displacements, thus minimizing the code implementation effort.

Now one can clearly see that the incremental localization tensor, $\lambda_{ijk}^1$, and consequently the homogenized tangent constitutive tensor, $C_{ijkl}^0$, are affected by cracks and cohesive zones through the stiffness matrix, $[K^1]$. Also note that the global scale history dependent term, $\Delta\sigma_{ij}^{R0}$ also depends on the damage accumulated at the local scale through $\Delta u_i^{R1}$. It is important to note that the stiffness matrix, $[K^1]$, is the same stiffness matrix usually assembled in common FE algorithms.

What is claimed is:

1. A computer-based method of predicting roadway failure under loads applied to an asphalt surface of a roadway by vehicles, comprising:
   inputting into a graphical user interface one or more values relating to vehicular forces applied to an asphalt surface of a roadway;
   determining macroscale stresses resulting from the vehicular forces throughout a volume below the asphalt surface, wherein the volume comprises a plurality of layers, wherein determining macroscale stresses comprises:
      determining a global scale finite element mesh having a boundary coincident with a boundary of the roadway;
      determining boundary conditions at the boundary of the global scale mesh from parameters associated with the geometry of the roadway and the forces applied by vehicles; and
      determining values of the stresses over the global scale mesh by solving the Initial Boundary Value Problem (IBVP) subject to the boundary conditions; and
   determining a microscale fracture process due to the macroscale stresses, wherein the microscale fracture process is expressed in terms of a set of microscale fracture parameters, the set of microscale fracture parameters comprising a damage parameter defined in the cohesive zone ahead of crack tips, wherein determining the microscale fracture process comprises determining:
      a set of length scales having a hierarchical order, wherein the largest length scale is associated with the global scale mesh;
      a plurality of local meshes associated to integration points in the global mesh, wherein a local mesh has a boundary and is associated with a length scale different from the length scale associated with the global mesh;
      boundary conditions of the local scale meshes from values of the strains or stresses at locations on the global scale mesh, in particular, the location of integration points in the global scale mesh; and values of
      the stress field, the displacement field, and the damage parameter over the local scale meshes by solving local scale IBVPs for each local mesh using boundary conditions associated with the local mesh;
   wherein the stress filed on a length scale associated with a local mesh determines the stresses at locations on the length scale associated with the global mesh, and the values of the damage parameter over the local scale mesh describes the fracture process within the local scale mesh;
   wherein the microscale fracture process is predictive of roadway failure.

2. The method of claim 1, wherein determining values of the stresses comprises solving a global scale Initial Boundary Value Problem (IBVP) for the global mesh, obtaining stresses and displacement fields as outcomes.

3. The method of claim 2, wherein the global scale IBVP comprises conservation of linear momentum, conservation of angular momentum, strain-displacement relationship, and constitutive equations for the roadway.

4. The method of claim 3, wherein the constitutive equations depend upon the current values of strains or the history of strains.

5. The method of claim 3, wherein the equations in the global scale IBVP are solved using the finite element method.

6. The method of claim 1, wherein the local scale IBVP comprises conservation of linear momentum, conservation of angular momentum, the strain-displacement relationship, constitutive equations, and a fracture criterion.

7. The method of claim 6, wherein the stresses at locations on the length scale associated with the global mesh are related to the stress field over the local scale mesh by homogenization principles, wherein homogenization principles comprise an averaging of the stress field on the length scale associated with the local scale mesh.

8. The method of claim 7, wherein determining microscale fracture process further comprises determining:
   a plurality of cohesive zones ahead of crack tips, wherein the length scale associated with a cohesive zone is smaller than the length scale associated with a local scale mesh;
   boundary conditions on the cohesive zones, wherein a cohesive zone has a boundary and the boundary conditions of a cohesive zone are determined from the traction forces observed at locations on the local scale meshes over the surfaces of the cohesive zones; and
   values of the traction forces, the displacement field, and a scalar damage parameter on the local scale meshes by solving a microscale IBVP for a cohesive zone using the boundary conditions of the cohesive zone;

wherein the values of the traction forces and the displacement field on a length scale associated with a cohesive zone determine the values of the traction forces and the displacement field on a length scale associated with a local scale mesh containing the cohesive zones, and the values of the scalar damage parameter describes the fracture process within the cohesive zone.

9. The method of claim 8, wherein the microscale IBVP comprises a traction-displacement relation.

10. The method of claim 9, wherein the values of the traction forces on the length scale associated with the local scale mesh are related to the values of the traction forces on a length scale associated with a cohesive zone by homogenization principles, wherein the homogenization principles comprise an averaging of the values of the traction forces on the length scale associated with the cohesive zone.

11. The method of claim 8, wherein the scalar damage parameter is a sum of relative areas of undamaged fibrils throughout a cohesive zone.

12. The method of claim 1, wherein the parameters are chosen from: aggregate volume fraction, aggregate shape, aggregate angularity, aggregate stiffness, aggregate toughness, and asphalt binder viscoelastic properties.

13. The method of claim 1, wherein the roadway surface material comprises an asphalt concrete material.

14. The method of claim 13, wherein the roadway volume comprises a hot-mix asphalt (HMA) layer, a base layer, a subbase layer, and a subgrade layer, where the subgrade layer is the existing soil, the subbase layer is built on top of the subgrade layer, the base layer is built on top of the subbase layer and HMA layer is built on top of the base layer.

15. The method of claim 14 wherein the HMA layer is modeled as viscoelastic material.

16. The method of claim 15, wherein the base layer, the subbase layer and the subgrade layer are modeled as elastic materials.

17. A computer-based method of determining a desired composition of a roadway material, comprising:
   providing initial values of parameters in a first set of parameters representing the composition of the roadway material, the first set of parameters having one or more values associated with it;
   predicting the failure of the roadway material under loads applied to an asphalt surface of a roadway by vehicles, comprising:
      inputting into a graphical user interface one or more values relating to vehicular forces applied to an asphalt surface of a roadway;
      determining macroscale stresses resulting from the vehicular forces throughout a volume below the asphalt surface, wherein the volume comprises a plurality of layers, wherein determining macroscale stresses comprises:
         determining a global scale finite element mesh having a boundary coincident with a boundary of the roadway;
         determining boundary conditions at the boundary of the global scale mesh from parameters associated with the geometry of the roadway and the forces applied by vehicles; and
         determining values of the stresses over the global scale mesh by solving the Initial Boundary Value Problem (IBVP) subject to the boundary conditions; and
      determining a microscale fracture process due to the macroscale stresses, wherein the microscale fracture process is expressed in terms of a set of microscale fracture parameters, the set of microscale fracture parameters comprising a damage parameter defined in the cohesive zone ahead of crack tips, wherein determining the microscale fracture process comprises determining:
         a set of length scales having a hierarchical order, wherein the largest length scale is associated with the global scale mesh;
         a plurality of local meshes associated to integration points in the global mesh, wherein a local mesh has a boundary and is associated with a length scale different from the length scale associated with the global mesh;
         boundary conditions of the local scale meshes from values of the strains or stresses at locations on the global scale mesh, in particular, the location of integration points in the global scale mesh; and values of
         the stress field, the displacement field, and the damage parameter over the local scale meshes by solving local scale IBVPs for each local mesh using boundary conditions associated with the local mesh;
      wherein the stress filed on a length scale associated with a local mesh determines the stresses at locations on the length scale associated with the global mesh, and the values of the damage parameter over the local scale mesh describes the fracture process within the local scale mesh;
   wherein the microscale fracture process is predictive of roadway failure;
   determining a lifetime of the roadway material from the failure prediction;
   adjusting the values of the first set of parameters in the set of parameters to form a second set of parameters; and
   determining a lifetime of the roadway material from the second set of parameters so as to improve the lifetime of the roadway material sufficiently.

* * * * *

UNITED STATES PATENT AND TRADEMARK OFFICE
CERTIFICATE OF CORRECTION

PATENT NO.        : 9,091,027 B2
APPLICATION NO.   : 13/512183
DATED             : July 28, 2015
INVENTOR(S)       : David Allen et al.

It is certified that error appears in the above-identified patent and that said Letters Patent is hereby corrected as shown below:

On the title page, item (56) References Cited

Column 2, Line 5 (Other Publications), delete "!nite" and insert -- finite , therefor.

Signed and Sealed this
Twenty-first Day of June, 2016

Michelle K. Lee
*Director of the United States Patent and Trademark Office*